United States Patent
Li et al.

(10) Patent No.: US 10,496,685 B2
(45) Date of Patent: Dec. 3, 2019

(54) REDIS KEY MANAGEMENT METHOD AND SYSTEM

(71) Applicant: WANGSU SCIENCE & TECHNOLOGY CO., LTD., Shanghai (CN)

(72) Inventors: Yuting Li, Shanghai (CN); Yangbin Liu, Shanghai (CN); Yingwang Chen, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 407 days.

(21) Appl. No.: 15/508,339

(22) PCT Filed: Feb. 16, 2016

(86) PCT No.: PCT/CN2016/073845
§ 371 (c)(1),
(2) Date: Mar. 2, 2017

(87) PCT Pub. No.: WO2017/075923
PCT Pub. Date: May 11, 2017

(65) Prior Publication Data
US 2017/0286527 A1    Oct. 5, 2017

(30) Foreign Application Priority Data
Nov. 6, 2015  (CN) .......................... 2015 1 0750902

(51) Int. Cl.
*G06F 16/00* (2019.01)
*G06F 16/31* (2019.01)
(Continued)

(52) U.S. Cl.
CPC .......... *G06F 16/316* (2019.01); *G06F 3/0604* (2013.01); *G06F 16/11* (2019.01); *G06F 16/2272* (2019.01); *G06F 16/328* (2019.01)

(58) Field of Classification Search
CPC ............... G06F 3/0604; G06F 16/2272; G06F 16/24556; G06F 16/2465; G06F 16/328; G06F 16/86; G06F 16/211
See application file for complete search history.

(56) References Cited

U.S. PATENT DOCUMENTS 8,954,478 B2 * 2/2015 Shoolman ............... H03M 7/00
                                                   707/803
9,613,068 B2 * 4/2017 Tsirogiannis ......... G06F 16/211
(Continued)

FOREIGN PATENT DOCUMENTS

CN    102780768 A    11/2012
CN    103345423 A    10/2013
(Continued)

OTHER PUBLICATIONS

The European Patent Office (EPO) The Extended European Search Report for 16861196.0 dated Aug. 17, 2018 9 Pages.
(Continued)

*Primary Examiner* — Merilyn P Nguyen
(74) *Attorney, Agent, or Firm* — Anova Law Group, PLLC

(57) ABSTRACT

The present disclosure provides a Redis Key management method, for managing and controlling Redis Keys generated by a same task in a streaming framework, the Redis Key management method including: packaging the Redis Keys generated by the same task and storing packaged Redis Keys in a same Key bucket; performing a duplicate-removal processing on Redis Keys in the same Key bucket for being called by external data; and performing a batch deletion on Redis Keys after being called by external data. In the present disclosure, Redis Keys in the same task and located in the same partition may be stored in a Key bucket. Key buckets may be located. Duplicate-removal processing may be performed on the Redis Keys in the same Key bucket so that the Redis Keys can be called by external data. A batch deletion may be performed on the Redis Keys after being called by external data.

18 Claims, 7 Drawing Sheets

(51) Int. Cl.
*G06F 3/06* (2006.01)
*G06F 16/11* (2019.01)
*G06F 16/22* (2019.01)

(56) References Cited

U.S. PATENT DOCUMENTS

| | | | |
|---|---|---|---|
| 2012/0233668 A1* | 9/2012 | Leafe | G06F 9/44526 |
| | | | 726/4 |
| 2014/0059226 A1* | 2/2014 | Messerli | G06F 9/5072 |
| | | | 709/226 |
| 2014/0279838 A1 | 9/2014 | Tsirogiannis et al. | |
| 2016/0119679 A1* | 4/2016 | Randall | H04N 21/4627 |
| | | | 725/31 |
| 2016/0188426 A1* | 6/2016 | Kousha | G06F 16/00 |
| | | | 714/4.12 |
| 2018/0276314 A1* | 9/2018 | Zhang | G06F 17/248 |

FOREIGN PATENT DOCUMENTS

| | | |
|---|---|---|
| CN | 104881494 A | 9/2015 |
| CN | 105005585 A | 10/2015 |

OTHER PUBLICATIONS

The World Intellectual Property Organization (WIPO) International Search Report for PCT/CN2016/073845 dated Aug. 10, 2016 12 Pages.

* cited by examiner

REDIS KEY MANAGEMENT METHOD AND SYSTEM

FIELD OF THE DISCLOSURE

The present disclosure generally relates to the field of database technology and, more particularly, relates to the technical field of Redis Key, and specifically a Redis Key management method and system.

Storm is a real-time, distributed, and high fault-tolerant computation system. Same as Hadoop, large batches of data may be processed using Storm. However, besides ensuring high reliability, Storm can also enable the execution of the processing to be in real-time; that is, all the information can be processed. Storm also has features such as fault-tolerance and distributed computation, which enable Storm to be expanded to different computers for processing of large batches of data.

Redis is an open source Key-Value logging database written in ANSI-C, networked, in-memory, having optional durability, and providing APIs in many types of languages. Redis is a high-performance Key-Value database, similar to Memchached, and it supports more value types to be stored, including string, list, set, zset, and hash. These data types all support push/pop, add/remove, intersect sets, union sets, minus sets, and many other types of operations, and these operations are atomic transactions. On this basis, Redis supports a variety of different ways of sorting. Same as memchached, to ensure efficiency, data is cached in memory. The difference is, Redis periodically writes updated data into disk or writes modification operation into added log files, and achieves master-slave synchronization on the abovementioned basis.

During the task processing of Storm, the system applies Redis for data computation, and stores data in Redis temporarily. Redis is a database that stores data in the form of Key-values, so that the result of mass computation is accompanied by a massive number of Keys. When Redis simultaneously stores data of a plurality of tasks, it can be very difficult to locate the Redis Keys to be processed next.

BRIEF SUMMARY OF THE DISCLOSURE

In view of the shortcomings in conventional technology, the goal of the present disclosure includes providing a Redis Key management method and system, to solve the issue of being difficult to rapidly locate the desired Redis Keys caused by lack of management and control of Redis Keys.

To realize the abovementioned goal and other related goals, the present disclosure provides a Redis Key management method, configured for managing and controlling Redis Keys generated by a same task in a streaming framework, the Redis Key management method including: packaging the Redis Keys generated by the same task and storing packaged Redis Keys in a same Key bucket; performing a duplicate-removal processing on Redis Keys in the same Key bucket for being called by external data; and performing a batch deletion on Redis Keys after being called by external data.

Optionally, the Redis Keys generated by the same task are stored in the same Key bucket in a form of a duplicate-removal set datatype.

Optionally, the performing a duplicate-removal processing on Redis Keys in the same Key bucket for being called by external data includes: separating subsets having a preset number of Redis Keys from the Key bucket on a regular basis; performing a duplicate-removal processing on each subset separated from the Key bucket, such that no duplicated Redis Keys are included in each subset; and labeling a subset after the duplicate-removal processing for being called by external data.

Optionally, lua scripting is configured to separate subsets having a preset number of Redis Keys from the Key bucket and perform a duplicate-removal processing on each subset separated from the Key bucket, such that no duplicated Redis Keys are included in each subset; and when reaching a preset time interval for the duplicate-removal processing, a lua script is executed.

Optionally, the performing a batch deletion on Redis Keys after being called by external data includes: labeling Redis Keys called by external data in the subset; and determining if all Redis Keys included in the subset are called by external data on a regular basis, and delete all Redis Keys in the subset if all the Redis Keys in the subset are called by external data.

Optionally, the performing a batch deletion on Redis Keys after being called by external data further includes: when reaching a preset time interval for deletion each time, determining if the subset is in a pre-labeled deleting state, if in the pre-labeled deleting state, further determining a length value of the subset, and when the length value of the subset is equal to zero or the length value of the subset is equal to a pre-recorded number of Redis Keys in the subset called by external data, deleting all the Redis Keys in the subset.

Optionally, the Redis Keys in the subset called by external data are recorded in arrays.

Optionally, a pipeline technique in Redis is used to perform the batch deletion of Redis Keys.

To realize the abovementioned goal, the present disclosure further provides a Redis Key management system, configured for managing and controlling Redis Keys generated by a same task in a streaming framework, the Redis Key management system including: a Key bucket storing module, configured for packaging Redis Keys generated by a same task and storing packaged Redis Keys in a same Key bucket; a data duplicate-removal module, connected with the Key bucket storing module, configured for performing a duplicate-removal processing in Redis Keys in the same Key bucket for being called by external data; and a data deletion module, connected with the data duplicate-removal module, configured for performing a batch deletion on Redis Keys after being called by external data.

Optionally, the Key bucket storing module packages the Redis Keys generated by a same task and stores packaged Redis Keys in a same Key bucket in a form of a duplicate-removal set datatype.

Optionally, the data duplicate-removal module includes: a subset separating unit, configured for separating subsets having a preset number of Redis Keys from the Key bucket on a regular basis; a separation timing unit, connected with the subset separating unit, configured for setting a time interval for an execution of the subset separating unit each time; a duplicate-removal processing unit, connected with the subset separating unit and the separation timing unit respectively, configured for performing a duplicate-removal processing on each subset separated from the Key bucket such that no duplicated Redis Keys are included in each subset; and a subset labeling unit, connected with the duplicate-removal processing unit, configured for labeling a subset after the duplicate-removal processing for being called by external data.

Optionally, the subset separating unit, the separation timing unit, and the duplicate-removal processing unit are implemented through lua scripting, and when reaching a preset time interval for duplicate-removal processing, a lua script is executed.

Optionally, the data deletion module includes: a recording unit, connected with the subset labeling unit, configured for labeling Redis Keys in the subset called by external data; a determining unit, connected with the subset labeling unit, the recording unit, and a deletion timing unit respectively, configured for determining if all Redis Keys in the subset are called by external data; the deletion timing unit, connected with the determining unit, configured for setting a time interval for an execution of the determining unit each time; and a deletion unit, connected with the determining unit, configured for deleting all the Redis Keys in the subset when all the Redis Keys in the subset are called by external data.

Optionally, the determining unit further includes: a deleting-state determining subunit, configured for determining if the subset is in a pre-labeled deleting state when each time reaching a preset the time interval for deletion; a length-value determining subunit, connected with the deleting-state determining subunit, configured for determining if a length value of the subset is equal to zero or if the length value of the subset is equal to a pre-recorded number of Redis Keys in the subset called by external data, when the subset is in the pre-labeled deleting state; and when the length value of the subset is equal zero or the length value of the subset is equal to the pre-recorded number of Redis Keys in the subset called by external data, all the Redis Keys in the subset are deleted.

Optionally, the Redis Keys in the subset called by external data are recorded using arrays.

Optionally, a pipeline technique in Redis is used to perform the batch deletion of Redis Keys.

As mentioned above, the present disclosure provides a Redis Key management method and system, including the following advantages:

1. Redis Keys in the same task and located in the same partition may be stored in a Key bucket. Based on task labeling and partition, Key buckets may be located. Duplicate-removal processing may be performed on the Redis Keys in the same Key bucket so that the Redis Keys can be called by external data. A batch deletion may be performed on the Redis Keys after being called by external data, to effectively manage and control the Keys in the Redis, and rapidly locate the desired Redis Keys. The confusion of the Keys in Redis in conventional technology may be effectively solved.

In the present disclosure, Redis Keys generated by the same task may be packaged in a duplicate-removal set datatype and stored in into the same Key bucket so that the uniqueness of the Redis Keys may be maintained by the memory. The speed for duplicate-removal processing may be improved, and the management may be improved.

The present disclosure utilizes lua script to perform duplicate-removal operation, to avoid slow speed of duplicate-removal operation caused by using other methods. Complex logic in the programming may be avoided, and programming may be simpler.

The present disclosure utilizes batch deletion on Redis Keys, and round-trip time (rtt) of the interaction between the client and the server of the Redis may be reduced. Thus, the present disclosure effective overcomes various shortcomings in the conventional technology, and thus has high industrial utilization value.

| Description of element labeling | |
|---|---|
| 1 | Redis Keys management system |
| 11 | Key bucket storage module |
| 12 | data duplicate-removal module |
| 121 | subset separating unit |
| 122 | separation timing unit |
| 123 | duplicate-removal processing unit |
| 124 | subset labeling unit |
| 13 | data deletion module |
| 131 | recording unit |
| 132 | determining unit |
| 132a | deleting-state determining subunit |
| 132b | length-value determining subunit |
| 133 | deletion timing unit |
| 134 | deleting unit |
| S1-S3 | steps |

DETAILED DESCRIPTION

Specific embodiments are illustrated as follows to describe the present disclosure. Those skilled in the art can easily understand the other advantages and effects of the present disclosure. The present disclosure may also be implemented or applied using other different embodiments. The various details in the present disclosure may also be based on different perspectives and applications, and may have various modifications and changes without departing from the spirit of the present disclosure.

During the task processing of Storm, the system applies Redis for data computation, and stores data in Redis temporarily. Redis is a database that stores data in the form of Key-values, so that the result of mass computation is accompanied by a massive number of Key. When Redis simultaneously stores data of a plurality of tasks, it can be very difficult to locate the Redis Keys to be processed next. The goal of the present embodiments of the present disclosure is to provide a Redis Keys management method and system, to solve the problem of being difficult to rapidly locate the desired Redis Keys caused by lack of management and controlling of Redis Keys. The detailed description of the working principles and operation of the Redis Keys management method and system provided by the present embodiments are provided as follows, so that those skilled in the art would understand a Redis Keys management method and system of the present embodiments without creative work.

As shown in FIGS. 1-10, the present embodiments provide a Redis Keys management method and system, involving the processing of Redis Keys in complex task scenarios by streaming framework (such as Storm, for illustrative purposes, Storm is used as an example to illustrate the streaming framework in the present embodiments), especially involving duplicate-removal processing and deletion processing. In the Redis Keys management method and system disclosed by the present embodiments, the concept of Key bucket is provided, to centralize the management of the Redis Keys generated by the same task, and to facilitate the use of Redis Keys in related tasks in the system. A more efficiently way is applied to implement duplicate-removal processing of the Redis Keys and delete the Keys from Redis after the use of the Redis Keys is complete.

Figure 1:
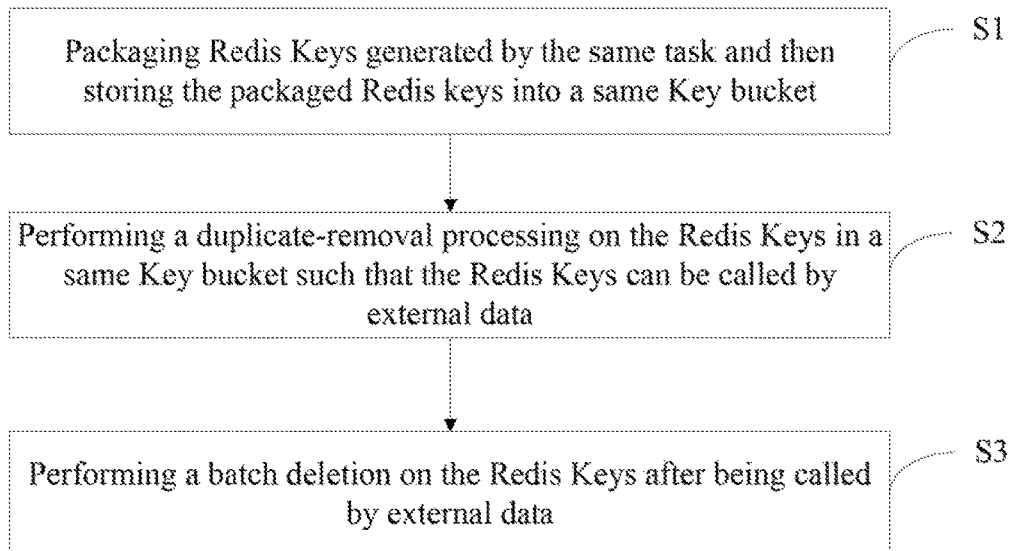
FIG. 1 illustrates an exemplary process flow of a Redis Keys management method according to the disclosed embodiments of the present disclosure.

Specifically, as shown in FIG. 1, the present embodiments provide a Redis Keys management method, to manage and control the Redis Keys generated by the same task in a streaming framework. The Redis Keys management method may include the following steps.

In step S1, the Redis Keys generated by the same task may be packaged and then the packaged Redis Keys may be stored in a same Key bucket.

Embodiments of the present disclosure provide the concept of Key bucket, to centralize the management of the Redis Keys generated by the same task. Based on task labeling and partition, Key buckets can be located. Duplicate-removal processing may be performed on the Redis Keys in the same Key bucket so the Redis Keys can be called by external data, and batch deletion may be performed on the Redis Keys after being called by external data. The Keys in Redis may be effectively managed and controlled, and the desired Redis Keys may be located rapidly. The confusion of the Keys in Redis in conventional technology may be effectively solved.

Specifically, in one embodiment, the Redis Keys generated by the same task may be packaged in a duplicate-removal set datatype and stored in a same Key bucket. For example, when Storm stores data into Redis database, the Redis Keys generated by the same task and located in the same partition may be stored in the Keys bucket in the form of set datatype. By using the duplicate-removal set datatype, the Redis Keys generated by the same task may be stored in the same Key bucket, so that the uniqueness of the Redis Keys may be maintained by the memory. Duplication in Redis Keys when being stored into the Key bucket may be avoided, and the uniqueness of the Redis Keys may be ensured. The speed for duplicate-removal processing may be improved, and the management may be improved.

Figure 2:
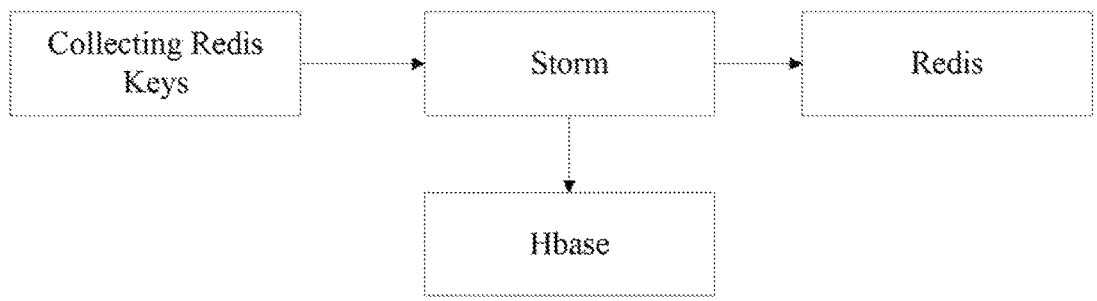
FIG. 2 illustrates an exemplary task processing framework of Storm in the Redis Keys management method according to the disclosed embodiments of the present disclosure.

In one embodiment, the task processing framework of Storm is shown in FIG. 2. After reading out data, Storm may store the data into Redis database and Hbase database.

Figure 3:
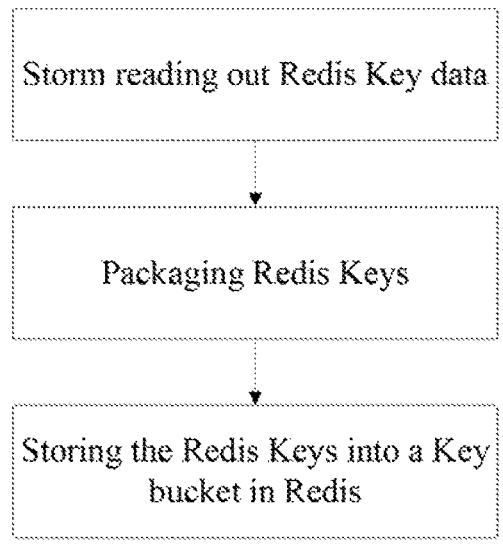
FIG. 3 illustrates an exemplary process flow of storing data to Redis in the Redis Keys management method according to the disclosed embodiments of the present disclosure.

Specifically, as shown in FIG. 3, when storing data into Redis database, Storm may store the Redis Keys generated in the same task and located in the same partition in the Keys bucket in the form of set datatype, specifically including: Storm reading out data, Storm further packaging the Redis Keys generated in the same task and located in the same partition, then, Storm storing the packaged Redis Keys into the Keys bucket in the form of set datatype, and Storm storing the data into Redis database.

In step S2, a duplicate-removal processing may be performed on the Redis Keys in a same Keys bucket so that the Redis Keys can be called by external data.

Specifically, in one embodiment, performing a duplicate-removal processing on the Redis Keys in a same Keys bucket so that the Redis Keys can be called by external data may specifically include: separating subsets containing a preset number of Redis Keys from the Keys bucket on a regular basis, further performing a duplicate-removal processing in each subset such that no duplicated Redis Keys is included in each subset, and lastly, labeling the subsets undergone the duplicate-removal processing so that the Redis Keys can be called by external data.

In one embodiment, specifically, lua scripting may be utilized to separate a subset containing a preset number of Redis Keys from the Keys bucket on a regular basis and perform a duplicate-removal processing on each subset such that no duplicated Redis Keys are included in each subset. Each time when reaching the preset time interval for the duplicate-removal processing, the lua script may be executed. In the lua script, a subset of a certain length (the length is set based on the number of logs generated by specific tasks) may be obtained from the set based on a regular basis, to ensure no duplicated Keys are included in different subsets, so that it is easier for subsequent processing of Redis Keys. By using lua script to perform duplicate-removal operation, low speed caused by duplicate-removal processing using other ways may be avoided. Complex logic in the programming process may be avoided, and programming may be simpler.

Figure 4:
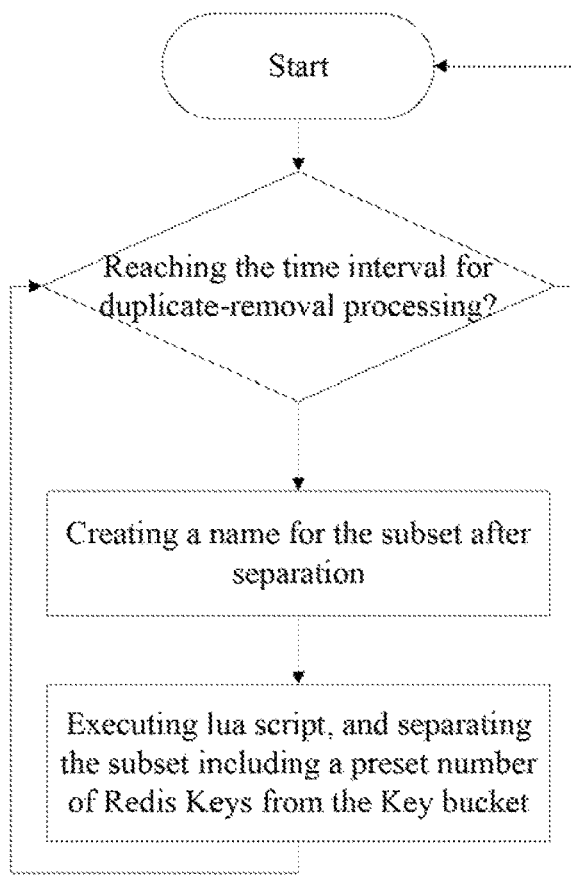
FIG. 4 illustrates an exemplary Key duplicate-removal process in the Redis Keys management method according to the disclosed embodiments of the present disclosure.

Specifically, in one embodiment, as shown in FIG. 4, each time when reaching the preset time interval for the duplicate-removal processing, a name may be created for the subset after separation (that is, a new Redis Keys may be created for the subset separated from the Keys bucket) and the lua script may be executed, and the subset having the preset length may be separated from the Keys bucket again. The preset time interval for the duplicate-removal processing may be 10 seconds to 50 seconds. In one embodiment, the time interval for the duplicate-removal processing may be 30 seconds.

Specifically, then executing step S2, a thread for the duplicate-removal operation may be arranged. The Storm may start the thread to determine if the time interval for the duplicate-removal operation is greater than 30 seconds. If greater than 30 seconds, the duplicate-removal operation may be executed; otherwise, the thread may continue to proceed to the next loop. Further, based on the Redis Keys in the Keys bucket, a new Redis Keys (the name of the subset) may be created for the subset (rotating) after being separated, and the lua script may be executed, to separate the subset (rotating) having a certain length (the length is set based on the tasks) from the Keys bucket.

In step S3, a batch deletion may be performed on the Redis Keys after being called by external data.

Specifically, in one embodiment, the batch deletion performed on the Redis Keys after being called by external data may include: recording the labeled Redis Keys being called by external data in the subsets. In one embodiment, the labeled Redis Keys called by external data may be recorded in the form of array (e.g., segment). Further, the Redis Keys in the subset may be inquired on a regular basis to determine if all the Redis Keys in the subset has being called by external data. All the Redis Keys in the subset may be deleted when all the Redis Keys in the subset have been called by external data. A batch deletion may be performed on the Redis Keys through the pipeline technique in the Redis.

Figure 5:
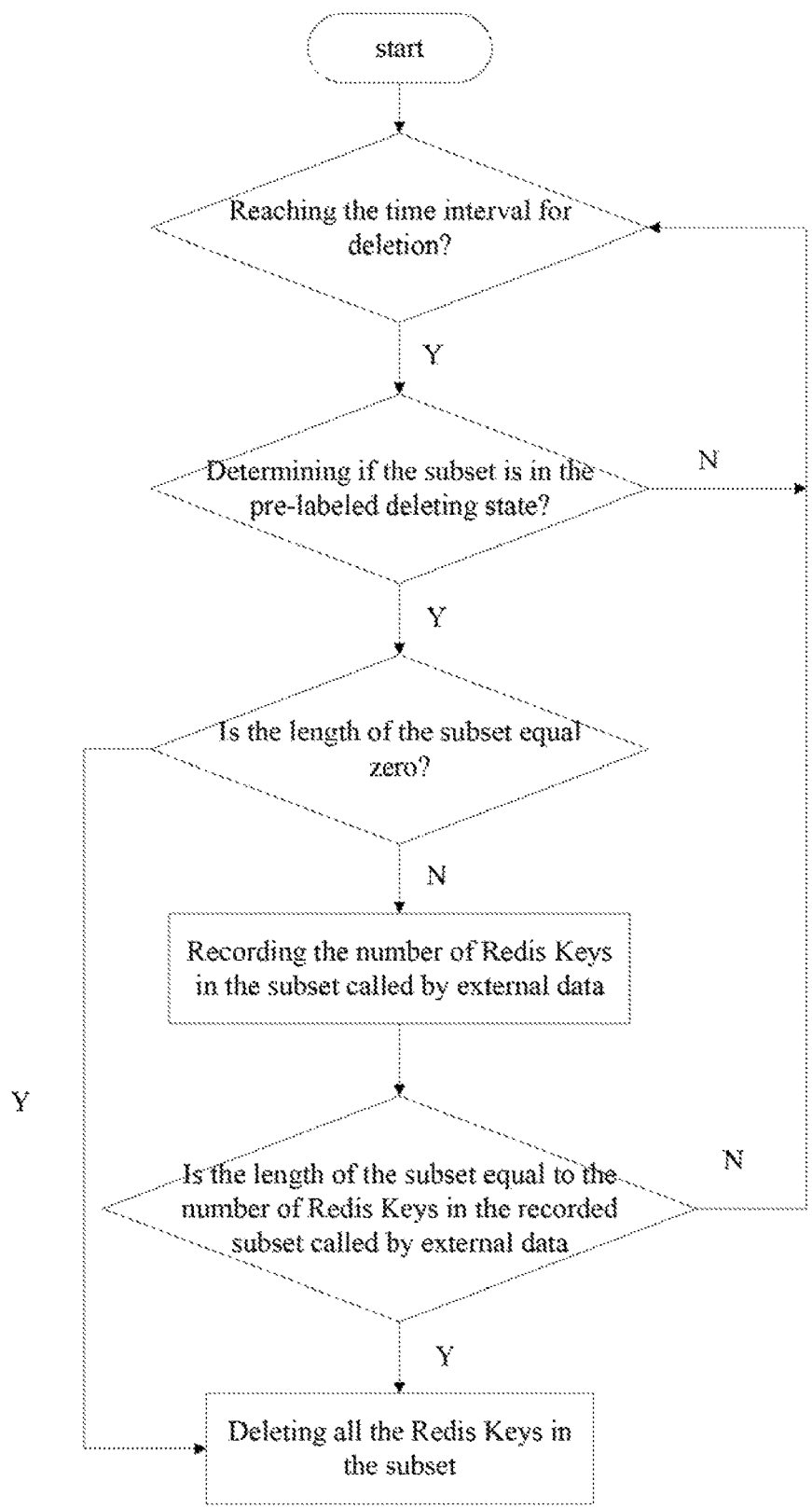
FIG. 5 illustrates an exemplary batch deletion of Keys in the Redis Keys management method according to the disclosed embodiments of the present disclosure.

Further, as shown in FIG. 5, performing a batch deletion on the Redis Keys after being called by external data may include: each time when reaching a preset time interval for deletion, determining if the subset is in a pre-labeled deleting state. If the subset is in a deleting state, the length value of the subset may be further determined. When the length value of the subset is zero or the length value of the subset is equal to the pre-recorded number of Redis Keys called by external data, a pipeline scheme of Redis may be applied to perform a batch deletion on all the Redis Key in the subset. The preset time interval for deletion may be from 0.1 seconds to 5 seconds. In one embodiment, the preset time interval for deletion may be 1 second.

Figure 6:
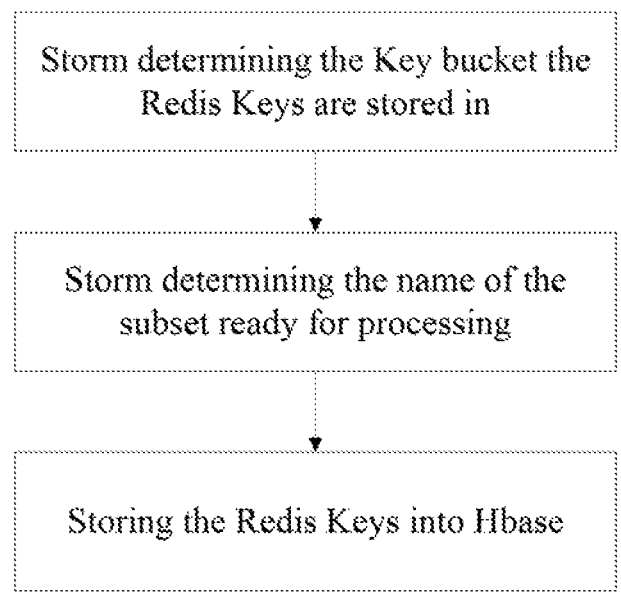
FIG. 6 illustrates an exemplary process of storing data into Hbase in the Redis Keys management method according to the disclosed embodiments of the present disclosure.

In one embodiment, as shown in FIG. 6, after performing a duplicate-removal operation on each subset, Storm may store the data to Hbase database, and process the Redis Keys using the Keys bucket.

Specifically, in one embodiment, as shown in FIG. 6, in step S3, Storm may determine the Keys bucket containing the Redis Keys based on the labeling of tasks and the partition of the data storage in Redis. Further, the Keys bucket may determine the subset (rotating) ready for processing based on the state (i.e., active and deleting) of the subset (rotating). Further, the Keys bucket may place the Keys that is ready for processing in the subset (rotating) in next Keys (the name of the subset determined to be ready for processing). Keys bucket may record the number of Keys to be processed in the subset (rotating) by using segment. Finally, Storm may store the data into Hbase database.

Specifically, in one embodiment, as shown in FIG. 5, each time when reaching the preset time interval for deletion, Storm may determine if the subset is in a pre-labeled deleting state. If the subset is in a deleting state, Storm gray continue to determine if the length value of the subset is equal to zero. When the length value of the subset is equal to zero, pipeline technique of the Redis may be applied to perform a batch deletion on all the Keys in the subset. If the length value of the subset is not equal to zero, Storm may continue to determine if the length value of the subset is equal to the number of Keys, recorded by the segment and ready for processing in the subset. If the length value of the subset is equal to the number of Keys, recorded by the segment and ready for processing in the subset, the pipeline technique of the Redis may be applied to perform a batch deletion on all the Keys in the subset.

Specifically, when implementing step S3, a thread for batch deletion may be arranged. Storm may start the thread, and determine if the time interval for deletion is greater than 1 second. If greater than 1 second, the thread may perform deletion; otherwise, the thread may proceed to the next loop. The thread may perform a loop in Keys bucket to determine if the subset (rotating) can be deleted, and further determine if the subset (rotating) is in active state. If the subset is in active state, the thread may continue to proceed to the next loop, and further determine if the length value of the subset (rotating) is zero. If the length value of the subset (rotating) is determined to be zero, pipeline technique of the Redis may be applied to delete all the Keys in the subset (rotating). If the length value of the subset (rotating) is determined to be non-zero, the thread may calculate the number (size) of Keys used in the current subset (rotating) and recorded in the segment, and determine if the number (size) of used Keys is equal to the length value of the subset (rotating). If the number (size) of used Keys is equal to the length value of the subset (rotating), pipeline technique of the Redis may be applied to perform a batch deletion on all the Keys in the subset (rotating). If the number (size) of used Keys is not equal to the length value of the subset (rotating), the thread may proceed to the next loop. That is, the number of Redis Keys used in the subset may be counted. When the number of used Redis Keys is same as the length value of the subset, the Redis Keys in the subset may be deleted in a batch. This method may greatly improve the efficiency of the system. In addition, by applying batch deletion on Redis Keys, round-trip time (rtt) of the interaction between the client and the server of the Redis may be reduced.

Figure 7:
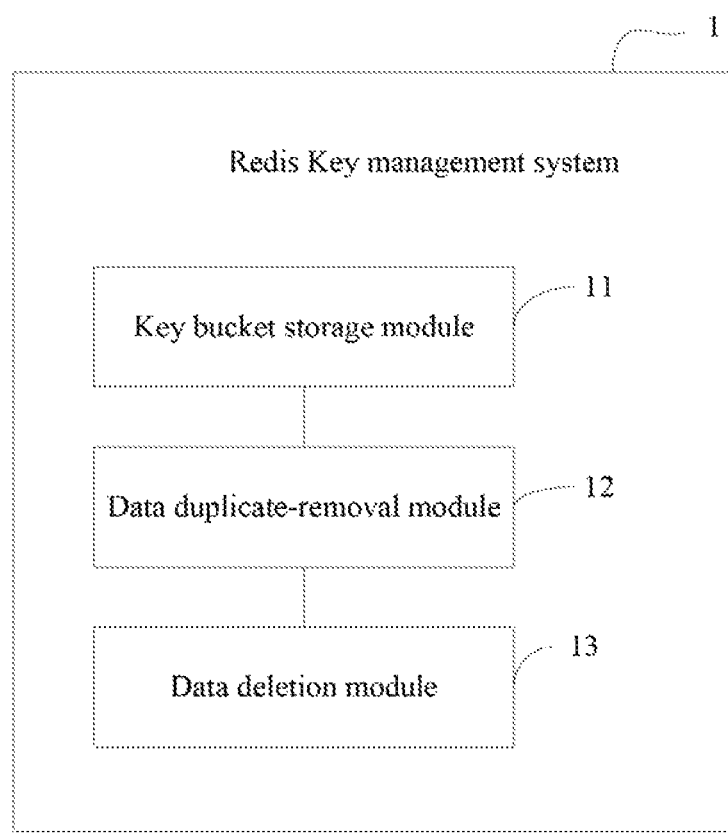
FIG. 7 illustrates an exemplary overall structure of a Redis Keys management system according to the disclosed embodiments of the present disclosure.

To implement the Redis Keys management method in the present embodiments, the present embodiments further provide a Redis Keys management system, for managing and controlling the Redis Keys generated by the same task in the streaming framework. Specifically, as shown in FIG. 7, the Redis Keys management system 1 may include: a Key bucket storage module 11, a data duplicate-removal module 12, and a data deletion module 13.

In one embodiment, the Key bucket storage module 11 may be configured to package Redis Keys generated by the same task and store the packaged Redis Keys in a same Key bucket.

Embodiments of the present disclosure provide the concept of Key bucket, to centralize the management of the Redis Keys generated by the same task. Based on task labeling and partition, Key buckets may be located. Duplicate-removal processing may be performed on the Redis Keys in the same Key bucket so that the Redis Keys can be called by external data, and a batch deletion may be performed on the Redis Keys after being called by external data. The Keys in Redis may be effectively managed and controlled. Desired Redis Key may be rapidly located. The confusion of Keys in Redis in conventional technology may be effectively solved.

Specifically, in one embodiment, the Key bucket storage module 11 may package the Redis Keys generated by the same task and then store the packaged Redis Keys in a same Key bucket in the duplicate-removal set datatype. For example, when Storm is storing data into Redis database, the Key bucket storage module 11 may store the Redis Keys, venerated by the same task and located in the same partition, in a Key bucket in the form of set datatype. By using duplicate-removal set datatype to package the Redis Keys generated by the same task and stored the packaged Redis Keys in a same Key bucket, the uniqueness of the Redis Keys may be maintained by the memory. Duplication of Redis Keys when stored into the Key bucket may be avoided, and the uniqueness of Redis Keys may be ensured. The speed of duplicate-removal processing may be improved, and the management may be improved.

In one embodiment, the task processing framework of Storm is shown in FIG. 2. After reading out data, Storm may store the data into Redis database and Hbase database, respectively.

Specifically, as shown in FIG. 3, when Storm is storing data into Redis database, the Key bucket storage module 11 may store the Redis Keys, generated by the same task and located in the same partition, in a Key bucket in the form of set datatype. Specifically, the process may include: Storm reading out data, and the Key bucket storage module 11 storing the Redis Keys, generated by the same task and located in the same partition, in a Key bucket in the form of set datatype. In this way, Storm may store the data into Redis database.

In one embodiment, the data duplicate-removal module 12 may be connected with the Key bucket storage module 11, to perform a duplicate-removal processing on the Redis Key in a same Key bucket so that the Redis Keys can be called by external data.

Figure 8:
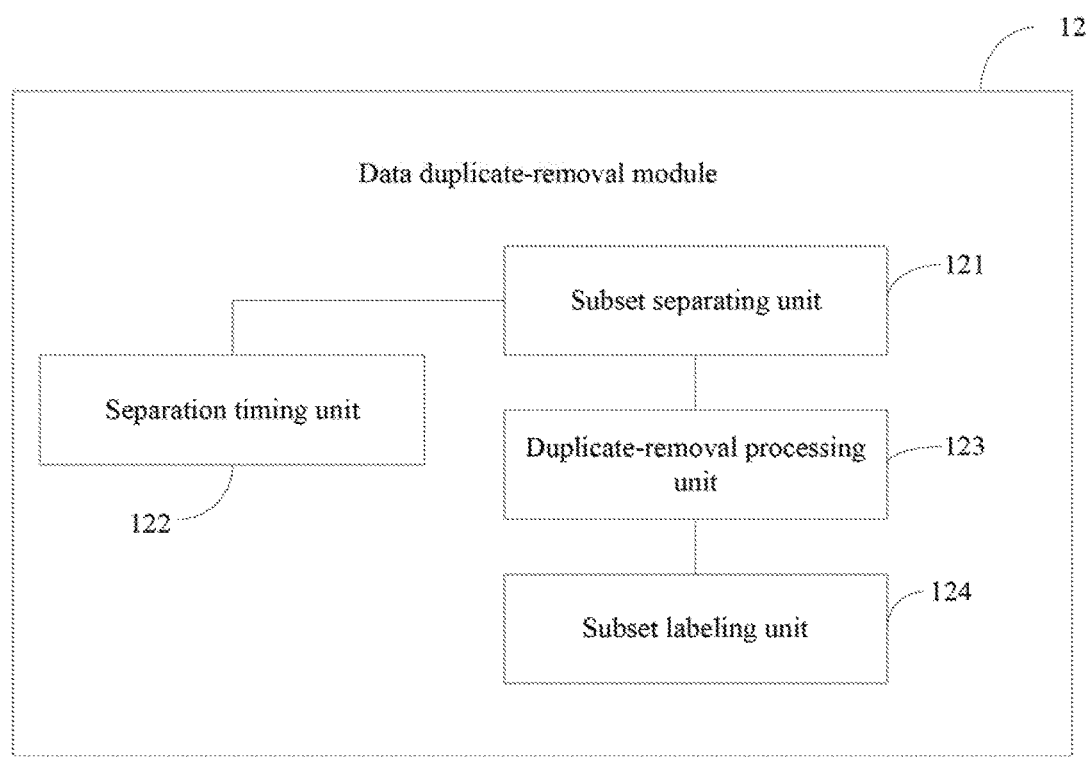
FIG. 8 illustrates an exemplary data duplicate-removal module in a Redis Keys management system according to the disclosed embodiments of the present disclosure.

Specifically, in one embodiment, as shown in FIG. 8, the data duplicate-removal module 12 may specifically include: a subset separating unit 121, a separation timing unit 122, a duplicate-removal processing unit 123, and a subset labeling unit 124.

In one embodiment, the subset separating unit 121 may be configured to separate a subset containing a preset number of Redis Keys from the Key bucket on a regular basis. The separation timing unit 122 may be connected to the subset separating unit 121, to set the time interval the subset separating unit 121 executes the separation each time. The preset time interval for the duplicate-removal processing may be from 10 seconds to 50 seconds. In one embodiment, specifically, the time interval for the duplicate-removal processing may be 30 seconds. The duplicate-removal processing unit 123 may be connected to the subset separating unit 121 and the separation timing unit 122, respectively, to perform duplicate-removal processing on each separated subset, so that no duplicated Redis Keys are included in each subset. The subset labeling unit 124 may be connected to the duplicate-removal processing unit 123, to label the subsets undergo the duplicate-removal processing so that the Redis Keys can be called by external data.

In one embodiment, the separation timing unit 122 may be used to enable the subset separating unit 121 to separate subsets each containing a preset number of Redis Keys from the Key bucket on a regular basis. Then, the duplicate-removal unit 123 may perform duplicate-removal processing on each separated subset, so that no duplicated Redis Keys may be included in each subset. Finally, the subset labeling unit 124 may label the subsets after the duplicate-removal processing so that the Redis Keys can be called by external data.

In one embodiment, the subset separating unit 121, the separation timing unit 122, and the duplicate-removal processing unit 123 may be implemented through lua scripting. Each time when reaching the preset time interval for the duplicate-removal processing, the lua script may be executed.

Specifically, lua scripting may be utilized to separate a subset containing a preset number of Redis Keys from the Keys bucket on a regular basis and perform a duplicate-removal processing in each subset such that no duplicated Redis Keys is included in each subset. Each time when reaching the preset time interval for the duplicate-removal processing, the lua script may be executed. In the lua script, a subset of a certain length (the length is set based on the number of logs generated by the specific tasks) may be obtained from the set based on a regular basis, to ensure no duplicated Keys are included in different subsets, so that it is easier for subsequent processing of the Redis Key. By using lua script to perform duplicate-removal operation, low speed caused by duplicate-removal processing using other ways may be avoided. Complex logic in the programming process may be avoided, and programming may be simpler.

Specifically, in one embodiment, as shown in FIG. 4, each time when reaching the time interval for the duplicate-removal processing preset by the separation timing unit 122, a name may be created for the subset (i.e., creating new Redis Keys for the subsets separated from the Key bucket) after separation, and lua script may be executed for the duplicate-removal processing. Then a subset having a preset length may be separated from the Key bucket again.

Specifically, in practice, a thread for the duplicate-removal operation may be arranged. The Storm may start the thread to determine if the time interval for the duplicate-removal operation is greater than 30 seconds. If greater than 30 seconds, the duplicate-removal operation may be executed; otherwise, the thread may continue to proceed into the next loop. Further, based on the Redis Keys in the Keys bucket, a new Redis Keys (name of the subset) may be created for the subset (rotating) after being separated, and the lua script may be executed, to separate the subset (rotating) having a certain length (the length is set based on the tasks) from the Keys bucket.

In one embodiment, the data deletion module 13 may be connected with the data duplicate-removal module 12, to perform a batch deletion on the Redis Keys after being called by external data.

Figure 9:
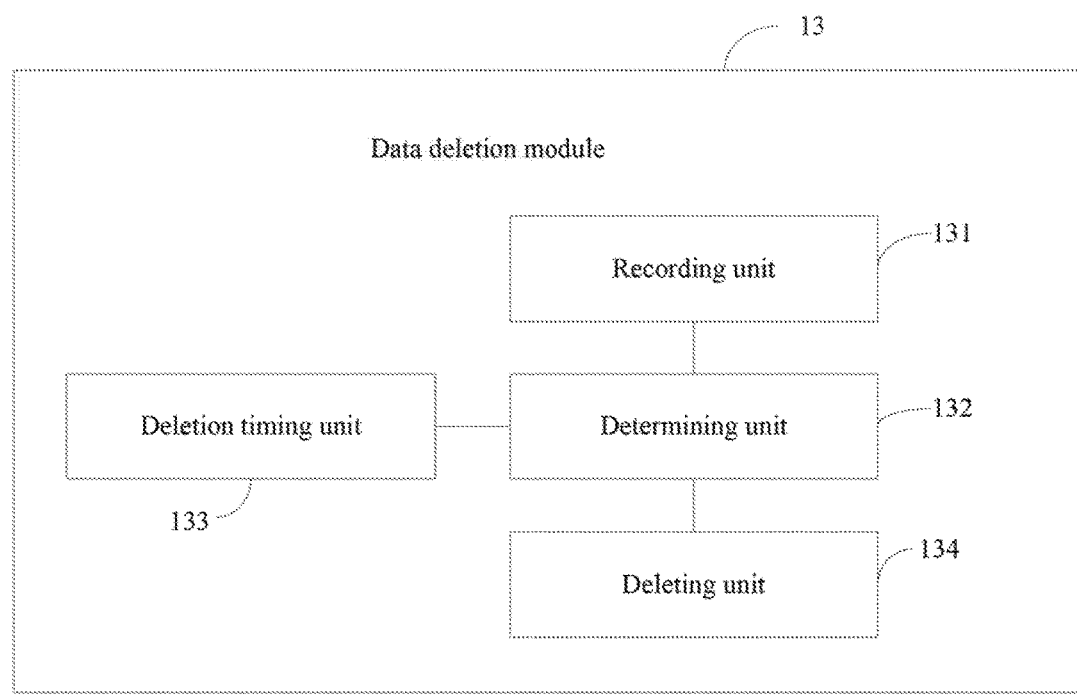
FIG. 9 illustrates an exemplary data deletion module in a Redis Keys management system according to the disclosed embodiments of the present disclosure.

Specifically, in one embodiment, as shown in FIG. 9, the data deletion module 13 may include: a recording unit 131, a determining unit 132, a deletion timing unit 133, and a deleting unit 134.

In one embodiment, the recording unit 131 may be connected with the subset labeling unit 124, to record Redis Keys, in the subset, called by external data. In one embodiment, the recording unit 131 may record the Redis Keys, in the subset and called by external data, in the form of arrays. The determining unit 132 may be connected with the subset labeling unit 124, the recording unit 131, and the deletion timing unit 133, to determine if all the Redis Keys included in the subset are called by external data. The deletion timing unit 133 may be connected to the determining unit 132, to set the time interval for the execution of the determining unit 132. The preset time interval for deletion may be from 0.1 seconds to 5 seconds. In one embodiment, the time interval for deletion may be 1 second. The deleting unit 134 may be connected to the determining unit 132 to delete all the Redis Keys in the subset when all the Redis Keys included in the subset are called by external data.

Figure 10:
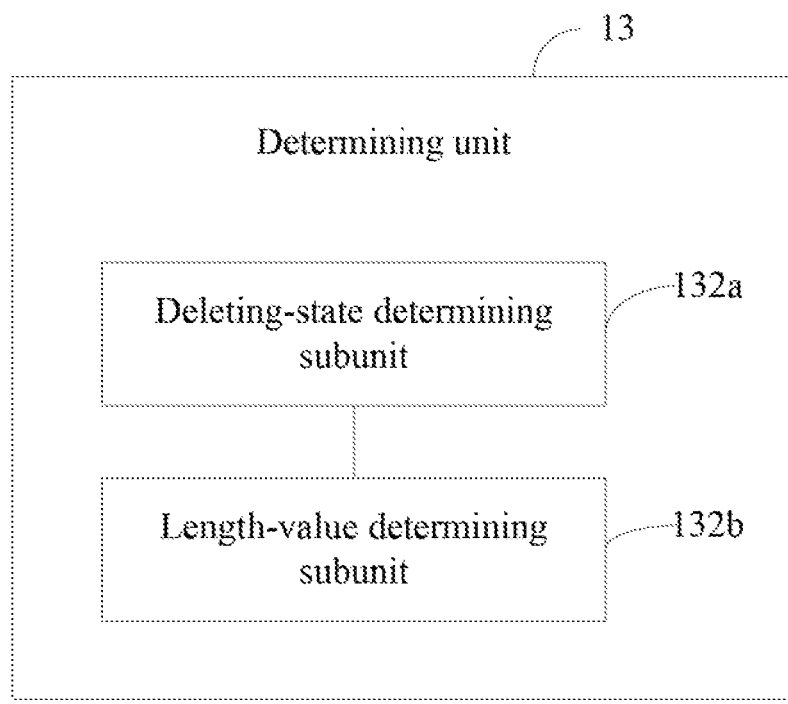
FIG. 10 illustrates an exemplary structure of a determining unit in a Redis Keys management system according to the disclosed embodiments of the present disclosure.

In one embodiment, specifically, as shown in FIG. 10, the determining unit 132 may further include: a deleting-state determining subunit 132*a* and a length-value determining subunit 132*b*.

Specifically, in one embodiment, the deleting-state determining subunit 132*a* may determine if the subset is in a pre-labeled deleting state when each time reaching the preset time interval for deletion. The length-value determining subunit 132*b* may be connected to the deleting-state determining subunit 132*a*, to determine if the length value of the subset is equal to zero or if the length value of the subset is equal to the pre-recorded number of Redis Keys in the subset called by external data, when the subset is in the pre-labeled deleting state.

When the length value of the subset is equal to zero or when the length value of the subset is equal to the pre-recorded number of Redis Keys in the subset called by external data, the deleting unit 134 may perform a batch deletion on all the Redis Keys in the subset using a pipeline technique.

Specifically, in one embodiment, when each time reaching the preset time interval for deletion set by the deletion timing unit 133, the determining unit 132 may determine if the subset is in a pre-labeled deleting state. If the subset is in the pre-labeled deleting state, the length-value determining subunit 132*b* may continue to determine if the length of the subset is zero. When the length value of the subset is zero, the deleting unit 134 may apply a pipeline technique to perform a batch deletion on all the Keys in the subset. If the length-value determining unit 132 determines the length of the subset is non-zero, the length-value determining subunit 132b may continue to determine if the length of the subset is equal to the number of Keys being processed, in the subset and recorded in the segment. When the length of the subset is equal to the number of Keys being processed, in the subset and recorded in the segment, the deleting unit 134 may apply a pipeline technique to perform a batch deletion on all the Keys in the subset.

Specifically, a thread for batch deletion may be arranged. Storm may start the thread, and the deletion timing unit 133 may determine if the time interval for deletion is greater than 1 second. If greater than 1 second, the thread may perform deletion; otherwise, the thread may proceed to the next loop. The thread may perform a loop in Keys bucket, and the deleting-state determining subunit 132a may determine if the subset (rotating) can be deleted, i.e., determine if the subset (rotating) is in active state. If in active state, the thread may start the next loop, and the determining unit 132 may further determine if the length value of the subset (rotating) is zero. If the length value of the subset (rotating) is determined to be zero, pipeline technique of the Redis may be applied to delete all the Keys in the subset (rotating). If the length value of the subset (rotating) is determined to be non-zero, the thread may calculate the number (size) of Keys used in the present subset (rotating) and recorded in the segment, and determine if the number (size) of used Keys is equal to the length value of the subset (rotating). If the number (size) of used Keys is equal to the length value of the subset (rotating), pipeline technique of the Redis may be applied to perform a batch deletion on all the Keys in the subset (rotating). If the number (size) of used Keys is not equal to the length value of the subset (rotating), the thread may proceed to the next loop. That is, the number of Redis Keys used in the subset may be counted. When the number of used Redis Keys is same as the length value of the subset, the Redis Keys may be deleted in a batch. This method may greatly improve the efficiency of the system. In addition, by applying batch deletion on Redis Keys, round-trip time (rtt) of the interaction between the client and the server of the Redis may be reduced.

Accordingly, in the present disclosure, Redis Keys in the same task and located in the same partition may be stored in a Key bucket. Based on task labeling and partition, Key buckets may be located. Duplicate-removal processing may be performed on the Redis Keys in the same Key bucket so that the Redis Keys can be called by external data. A batch deletion may be performed on the Redis Keys after being called by external data, to effectively manage and control the Keys in the Redis, and rapidly locate the desired Redis Keys. The confusion of the Keys in Redis in conventional technology may be effectively solved. In the present disclosure, Redis Keys generated by the same task may be packaged in a duplicate-removal set datatype and stored in into the same Key bucket so that the uniqueness of the Redis Keys may be maintained by the memory. The speed for duplicate-removal processing may be improved, and the management may be improved. The present disclosure utilizes lua script to perform duplicate removal operation, to avoid slow speed of duplicate-removal operation caused by using other methods. Complex logic in the programming may be avoided, and programming may be simpler. The present disclosure utilizes batch deletion on Redis Keys, and round-trip time (rtt) of the interaction between the client and the server of the Redis may be reduced. Thus, the present disclosure effective overcomes various shortcomings in the conventional technology, and thus has high industrial utilization value.

The above embodiments are only exemplary to illustrate the principles and effects of the present disclosure, and are not intended to limit the scope of the present disclosure. Any person skilled in the art can make modifications or changes to the abovementioned embodiments without departing from the spirit and scope of the present disclosure. Thus, all equivalent modifications or changes by those skilled in the art, without departing from the spirit and technology disclosed by the present disclosure should also be covered by the claims of the present disclosure.

What is claimed is:

1. A Redis Key management method, configured for managing and controlling Redis Keys generated by a same task in a streaming framework, the Redis Key management method comprising:
   packaging the Redis Keys generated by the same task and storing packaged Redis Keys in a same Key bucket, wherein the Redis Keys generated by the same task and located in a same partition are stored in the same Key bucket in a form of a set datatype;
   performing a duplicate-removal processing on the Redis Keys in the same Key bucket for being called by an external program after the duplicate-removal processing; and
   performing a batch deletion in the same Key bucket on Redis Keys after being called by the external program.

2. The Redis Key management method according to claim 1, wherein: performing the duplicate-removal processing includes:
   separating a subset having a preset number of the Redis Keys from the same Key bucket on a regular basis;
   performing a duplicate-removal processing on each subset separated from the same Key bucket, such that no duplicated Redis Keys are included in each subset; and
   labeling a subset after the duplicate-removal processing for being called by the external program.

3. The Redis Key management method according to claim 2, further including:
   using lua scripting to separate the subset having the preset number of the Redis Keys from the same Key bucket and perform the duplicate-removal processing on each subset separated from the same Key bucket, such that no duplicated Redis Keys are included in each subset; and
   executing a lua script, when reaching a preset time interval for the duplicate-removal processing.

4. The Redis Key management method according to claim 2, wherein: performing the batch deletion includes:
   labeling Redis Keys called by the external program in the subset; and
   determining if all Redis Keys included in the subset are called by the external program on the regular basis, and deleting all the Redis Keys in the subset if all the Redis Keys in the subset are called by the external program.

5. The Redis Key management method according to claim 4, wherein performing the batch deletion further includes:
   when reaching a preset time interval for deletion each time, determining if the subset is in a pre-labeled deleting state, if in the pre-labeled deleting state, further determining a length value of the subset, and when the length value of the subset is equal to zero or the length value of the subset is equal to a pre-recorded number of Redis Keys in the subset called by the external program, deleting all the Redis Keys in the subset.

6. The Redis Key management method according to claim 4, wherein:
the Redis Keys in the subset called by the external program are recorded in arrays.

7. The Redis Key management method according to claim 6, wherein:
a pipeline technique in Redis is used to perform the batch deletion of the Redis Keys.

8. The Redis Key management method according to claim 1, wherein:
the same Key bucket is located based on a task labeling of the same task and a same partition of the Redis Keys.

9. The Redis Key management method according to claim 1, wherein:
packaging the Redis Keys includes packaging the Redis Keys generated by the same task among the plurality of tasks simultaneously stored in a Redis database.

10. A Redis Key management system, configured for managing and controlling Redis Keys generated by a same task in a streaming framework, comprising:
a processor for a computer configured for
packaging Redis Keys generated by a same task and storing packaged Redis Keys in a same Key bucket, wherein the Redis Keys generated by the same task and located in a same partition are stored in the same Key bucket in a form of a set datatype;
performing a duplicate-removal processing on the Redis Keys in the same Key bucket for being called by an external program after the duplicate-removal processing; and
performing a batch deletion in the same Key bucket on Redis Keys after being called by the external program.

11. The Redis Key management system according to claim 10, wherein the processor is further configured for:
separating a subset having a preset number of the Redis Keys from the same Key bucket on a regular basis;
setting a time interval for an execution of separating the subset
performing a duplicate-removal processing on each subset separated from the same Key bucket such that no duplicated Redis Keys are included in each subset; and
labeling a subset after the duplicate-removal processing for being called by the external program.

12. The Redis Key management system according to claim 11, wherein the processor is further configured for:
using lua scripting to separate the subset having the preset number of the Redis Keys from the same Key bucket and perform the duplicate-removal processing on each subset separated from the same Key bucket, such that no duplicated Redis Keys are included in each subset; and executing a lua script, when reaching a preset time interval for the duplicate-removal processing.

13. The Redis Key management system according to claim 11, wherein the processor is further configured for:
labeling Redis Keys in the subset called by the external program;
determining if all Redis Keys in the subset are called by the external program; and
deleting all the Redis Keys in the subset when all the Redis Keys in the subset are called by the external program.

14. The Redis Key management system according to claim 13, wherein the processor is further configured for:
determining if the subset is in a pre-labeled deleting state when each time reaching a preset the time interval for deletion;
determining if a length value of the subset is equal to zero or if the length value of the subset is equal to a pre-recorded number of Redis Keys in the subset called by the external program, when the subset is in the pre-labeled deleting state; and
when the length value of the subset is equal to zero or the length value of the subset is equal to the pre-recorded number of Redis Keys in the subset called by the external program, deleting all the Redis Keys in the subset.

15. The Redis Key management system according to claim 13, wherein the Redis Keys in the subset called by the external program are recorded using arrays.

16. The Redis Key management method according to claim 15, wherein: a pipeline technique in Redis is used to perform the batch deletion of the Redis Keys.

17. A Redis Key management method, comprising:
packaging Redis Keys generated by a same task in a streaming framework and storing packaged Redis Keys in a same Key bucket;
performing a duplicate-removal processing on the Redis Keys in the same Key bucket for being called by an external program, wherein performing the duplicate-removal processing includes:
separating a subset having a preset number of the Redis Keys from the same Key bucket on a regular basis,
performing a duplicate-removal processing on each subset separated from the same Key bucket, such that no duplicated Redis Keys are included in each subset, and
labeling a subset after the duplicate-removal processing for being called by the external program; and
performing a batch deletion on Redis Keys after being called by the external program.

18. The method according to claim 17, wherein:
the Redis Keys generated by the same task and located in a same partition are stored in the same Key bucket in a form of a set datatype.

* * * * *